US008989793B2

(12) United States Patent
Liang

(10) Patent No.: US 8,989,793 B2
(45) Date of Patent: Mar. 24, 2015

(54) REVERSE POWER CONTROL METHOD AND CONTROL APPARATUS

(75) Inventor: Longcheng Liang, Shenzhen (CN)

(73) Assignee: ZTE Corporation (CN)

( * ) Notice: Subject to any disclaimer, the term of this patent is extended or adjusted under 35 U.S.C. 154(b) by 856 days.

(21) Appl. No.: 13/142,600

(22) PCT Filed: Sep. 24, 2009

(86) PCT No.: PCT/CN2009/074190
§ 371 (c)(1),
(2), (4) Date: Jun. 29, 2011

(87) PCT Pub. No.: WO2010/075708
PCT Pub. Date: Jul. 8, 2010

(65) Prior Publication Data
US 2011/0281613 A1    Nov. 17, 2011

(30) Foreign Application Priority Data
Dec. 31, 2008  (CN) .......................... 2008 1 0189762

(51) Int. Cl.
H04B 7/00    (2006.01)
H04B 1/00    (2006.01)
H04B 17/00   (2006.01)
H04W 52/12   (2009.01)
H04W 52/14   (2009.01)
H04W 52/50   (2009.01)

(52) U.S. Cl.
CPC ............ *H04W 52/12* (2013.01); *H04W 52/146* (2013.01); *H04W 52/50* (2013.01); *Y02B 60/50* (2013.01)

USPC ....... 455/522; 455/69; 455/127.1; 455/67.13; 455/226.1

(58) Field of Classification Search
CPC ..................................................... H04W 52/12
USPC ................... 455/522, 69, 127.1, 67.13, 226.1
See application file for complete search history.

(56) References Cited

U.S. PATENT DOCUMENTS 5,216,692 A * 6/1993 Ling ............................. 375/130
5,396,516 A * 3/1995 Padovani et al. .............. 375/225

(Continued)

FOREIGN PATENT DOCUMENTS

CN        1335695 A     2/2002
CN        1720676 A     1/2006

(Continued)

*Primary Examiner* — Tilahun B Gesesse
(74) *Attorney, Agent, or Firm* — Brooks Kushman P.C.

(57) ABSTRACT

A reverse power control method includes: a base station presetting reverse outer loop threshold values according to radio configuration (RC) types; in the accessing process of a terminal, the base station selecting the preset reverse outer loop threshold value according to the RC type fed back by the terminal; the base station receiving the Eb/Nt of the reverse channel and comparing the received Eb/Nt with the selected reverse outer loop threshold value, if the Eb/Nt is larger than the reverse outer loop threshold value, the base station instructing the terminal to decrease the transmitting power; if the Eb/Nt is smaller than the reverse outer loop threshold value, the base station instructing the terminal to increase the transmitting power, so as to guarantee that the terminal accesses successfully. An apparatus for implementing reverse close loop power control and an apparatus for implementing reverse outer loop power control are also provided.

9 Claims, 2 Drawing Sheets

(56) References Cited

U.S. PATENT DOCUMENTS

| | | | |
|---|---|---|---|
| 6,151,508 A * | 11/2000 | Kim et al. | 455/522 |
| 6,445,917 B1 * | 9/2002 | Bark et al. | 455/423 |
| 6,526,031 B1 * | 2/2003 | Zaff et al. | 370/335 |
| 6,529,482 B1 * | 3/2003 | Lundby | 370/252 |
| 6,580,919 B1 * | 6/2003 | Saito | 455/522 |
| 6,760,598 B1 * | 7/2004 | Kurjenniemi | 455/522 |
| 6,791,954 B1 * | 9/2004 | Cheng et al. | 370/311 |
| 7,006,842 B2 * | 2/2006 | Bi et al. | 455/522 |
| 7,031,741 B2 * | 4/2006 | Lee et al. | 455/522 |
| 7,257,101 B2 * | 8/2007 | Petrus et al. | 370/332 |
| 7,269,389 B2 * | 9/2007 | Petrus et al. | 455/69 |
| 7,486,961 B2 * | 2/2009 | Lee et al. | 455/522 |
| 7,733,792 B2 * | 6/2010 | Lundby | 370/252 |
| 7,843,892 B2 * | 11/2010 | Mehrabanzad et al. | 370/342 |
| 7,860,042 B2 * | 12/2010 | Kim et al. | 370/318 |
| 7,983,708 B2 * | 7/2011 | Mehrabanzad et al. | 455/522 |
| 7,995,684 B2 * | 8/2011 | Montojo et al. | 375/345 |
| 8,150,408 B2 * | 4/2012 | Rezaiifar et al. | 455/452.2 |
| 8,385,266 B1 * | 2/2013 | Vargantwar et al. | 370/328 |
| 2002/0018453 A1 * | 2/2002 | Yu et al. | 370/333 |
| 2003/0050086 A1 * | 3/2003 | Lee et al. | 455/522 |
| 2004/0151264 A1 * | 8/2004 | Montojo et al. | 375/345 |
| 2005/0243749 A1 * | 11/2005 | Mehrabanzad et al. | 370/310.2 |
| 2005/0245279 A1 * | 11/2005 | Mehrabanzad et al. | 455/522 |
| 2006/0142045 A1 * | 6/2006 | Lee et al. | 455/522 |
| 2008/0207249 A1 * | 8/2008 | Choi et al. | 455/522 |
| 2011/0128851 A1 * | 6/2011 | Mehrabanzad et al. | 370/235 |
| 2011/0281613 A1 * | 11/2011 | Liang | 455/522 |

FOREIGN PATENT DOCUMENTS

| | | |
|---|---|---|
| CN | 1968037 A | 5/2007 |
| CN | 101494894 A | 7/2009 |

* cited by examiner

REVERSE POWER CONTROL METHOD AND CONTROL APPARATUS

CROSS-REFERENCE TO RELATED APPLICATIONS

This application is a U.S. national phase of PCT Application No. PCT/CN2009/074190 filed Sep. 24, 2009 which claims priority to Chinese Application No. 200810189762.5 filed Dec. 31, 2008, the disclosures of which are incorporated in their entirety by reference herein.

TECHNICAL FIELD

The present invention relates to the reverse power control technology in a radio communication system, and particularly, to the technology of setting and adjusting reverse outer loop threshold values in a code division multiple address communication system.

BACKGROUND OF THE INVENTION

In a CDMA mobile communication system, a terminal and a base station interchange information by establishing a radio link between them. The link from the base station to the terminal is called a forward link, and the link from the terminal to the base station is called a reverse link. In the reverse link, if all users in the cell transmit signals with the same power, the signal from the terminal near to the base station is strong when reaching the base station, while the signal from the terminal far away from the base station is weak when reaching the base station, and the weak signal will be submerged in the strong signal so as to cause the problem of "near-far effect". The CDMA system is a self-interference system in which all users use the same frequency, and if the transmitting power of a user is strong, it will generate interference to other users and affect the system capacity. Similarly, if the transmitting power of a user is weak, it will make its communication quality poor or its access success rate low. Hence in order to overcome the problem of near-far effect and guarantee the communication quality of all users and the system capacity, the technology of reverse power control is applied in the CDMA system.

Reverse power control includes reverse open loop power control, reverse close loop power control and reverse outer loop power control. In the reverse open loop power control, the terminal estimates the quality of the radio environment of the reverse link according to the received power strength of the forward channel, and then determines the reverse transmitting power. The reverse open loop power control is based on the assumption that the deterioration of the reverse link is similar to that of the forward link.

The reverse close loop power control is implemented by the terminal together with the base station. The base station detects the Eb/Nt of the received reverse channel (Eb/Nt is the ratio of the energy received per bit to the total effective noise power; it is a parameter reflecting the signal to noise ratio), and compares the detected measurement value with the reverse outer loop threshold, so as to generate a power control command to the terminal. When the measurement value is larger than the reverse outer loop threshold, the base station instructs the terminal to reduce the transmitting power; and when the measurement value is smaller than the reverse outer loop threshold, the base station instructs the terminal to increase the transmitting power.

The reverse outer loop power control is a process that the base station adjusts the reverse outer loop threshold according to the frame error ratio (FER) of the reverse service channel; this process is implemented at the base station side. In the process of the reverse outer loop power control, a select distribute unit (SDU) calculates the current FER according to a power measurement report of the reverse service channel, compares the current FER with a target FER, and then dynamically adjusts the reverse outer loop threshold value according to the comparison result.

When a terminal accesses a base station system, the reverse open loop power control is firstly used; and when a service channel is established successfully, and the base station receives the prefix of the cell phone but not yet activate the select distribute module (SDM), whose function is to forward frames to an audio or data processing module according to the types of the frames, the reverse close loop power control is used, wherein the base station sets the same reverse outer loop threshold value for terminals of different radio configuration types. In a CDMA2000 system, it may be needed to support terminals of RC1 and RC3, since CDMA terminals use different RCs, different data transmission rates, and different transmitting powers. If the set reverse outer loop threshold value is low, it will cause the transmitting power of terminals of some RC types (such as RC1) to be always very low (the transmitting power can not be higher than the reverse outer loop threshold value), consequently, the base station cannot activate the SDM all the time and the access fails at last. Such situation may not happen to terminals of some RC types (such as RC3), but may happen to terminals of other RC types (such as RC1).

SUMMARY OF THE INVENTION

Considering that in present systems, there is a problem that terminals with certain radio configurations among terminals with different radio configurations may not access the base station, the present invention is proposed. According to such an object, the present invention provides a method and apparatus for reverse power control.

According to one aspect of the present invention, a method for reverse power control is provided, and the method comprises:

according to a radio configuration (RC) type, a base station presetting an initial value of a reverse outer loop threshold corresponding to the RC type;

in an accessing process of a terminal, the base station selecting the preset reverse outer loop threshold value corresponding to the RC type of the terminal according to the RC type fed back by the terminal;

the base station receiving Eb/Nt of the reverse channel, and comparing the received Eb/Nt with the reverse outer loop threshold value, if the Eb/Nt is larger than the reverse outer loop threshold value, the base station instructing the terminal to decrease transmitting power; if the Eb/Nt is smaller than the reverse outer loop threshold value, the base station instructing the terminal to increase transmitting power, so as to guarantee that the terminal accesses successfully.

Preferably, the method further comprises: after the terminal accesses successfully, the base station calculating current frame error ratio of reverse channel frames, comparing the current frame error ratio with a target frame error ratio, and adjusting the reverse outer loop threshold value according to the comparison result.

Preferably, the method further comprises: presetting a corresponding adjustment step length according to the RC type;

the step of adjusting the reverse outer loop threshold value according to the comparison result comprises: if the current frame error ratio is larger than the target frame error ratio, increasing the reverse outer loop threshold value according to the preset adjustment step length; if the current frame error ratio is smaller than the target frame error ratio, decreasing the reverse outer loop threshold value according to the preset adjustment step length.

Preferably, the method further comprises: comparing the adjusted reverse outer loop threshold value with a system specified reverse outer loop maximum threshold value, and if the adjusted reverse outer loop threshold value is larger than system specified reverse outer loop maximum threshold value, setting the adjusted reverse outer loop threshold value as the system specified reverse outer loop maximum threshold value; comparing the adjusted reverse outer loop threshold value with a system specified reverse outer loop minimum threshold value, and if the adjusted reverse outer loop threshold value is smaller than the system specified reverse outer loop minimum threshold value, setting the adjusted reverse outer loop threshold value as the system specified reverse outer loop minimum threshold value; in other situations, not changing the system specified reverse outer loop maximum and minimum threshold values.

Wherein, the RC is reverse radio configuration, and the type of RC is one or more of RC1, RC2, RC3, RC4, RC5 and RC6.

According to a second aspect of the present invention, an apparatus for reverse power control is provided, and the apparatus comprises:

a setting and selection unit, configured to preset a reverse outer loop threshold value according to a radio configuration (RC) type and select the preset reverse outer loop threshold value according to the RC type fed back by the terminal;

a comparison unit, configured to receive Eb/Nt of the reverse channel, compare the received Eb/Nt with the reverse outer loop threshold value selected by the setting and selection unit, and output the comparison result to a reverse outer loop threshold control unit;

the control unit, configured to instruct a transmitting power adjustment unit to increase or decrease transmitting power of the terminal according to the comparison result;

the transmitting power adjustment unit, configured to increase or decrease the transmitting power of the terminal according to the instruction of the reverse outer loop threshold control unit;

thereby implementing reverse close loop power control.

According to a third aspect of the present invention, an apparatus for reverse power control is provided, and the apparatus comprises:

a frame error ratio calculation unit, configured to calculate current frame error ratio of reverse channel frames and send the calculated frame error ratio to a reverse outer loop threshold adjustment unit;

the reverse outer loop threshold adjustment unit, configured to compare the received current frame error ratio with a target frame error ratio, and if the current frame error ratio is larger than the target frame error ratio, increase the reverse outer loop threshold value; if the current frame error ratio is smaller than the target frame error ratio, decrease the reverse outer loop threshold value.

Preferably, the reverse outer loop threshold adjustment unit is further configured to preset an adjustment step length according to the RC type and use the preset adjustment step length to adjust the reverse outer loop threshold value when increasing or decreasing the reverse outer loop threshold value, so as to acquire an adjusted reverse outer loop threshold value.

Preferably, the apparatus further comprises a system setting unit, which is configured to compare the adjusted reverse outer loop threshold value with a system specified reverse outer loop maximum threshold value, and if the adjusted reverse outer loop threshold value is larger than system specified reverse outer loop maximum threshold value, set the adjusted reverse outer loop threshold value as the system specified reverse outer loop maximum threshold value; to compare the adjusted reverse outer loop threshold value with a system specified reverse outer loop minimum threshold value, and if the adjusted reverse outer loop threshold value is smaller than the system specified reverse outer loop minimum threshold value, set the adjusted reverse outer loop threshold value as the system specified reverse outer loop minimum threshold value; and in other situations, not to change the system specified reverse outer loop maximum and minimum threshold values.

Compared with the prior art, the present invention introduces the RC parameters to set and adjust the reverse outer loop threshold, which is more suitable for terminal of different RC types, so that terminals of different RC types can adjust their transmitting powers to target transmitting powers quickly and it is guaranteed that terminal of various RC types can access the system quickly. In particular, the present invention focuses on the setting and application of the reverse outer loop threshold values used in the accessing process of terminals, and ultimately increases the access success rate of various types of terminals.

PREFERRED EMBODIMENTS OF THE PRESENT INVENTION

In CDMA, the RC defines the physical channel configurations, such as the transmission rate, modulation mode and spread factor, of CDMA radio signals. Each RC specifies a serial of 9.6 or 14.4 kbps based data rates. A significant difference between the CDMA2000 and IS-95 systems lies in the radio configuration. There are nine types of forward radio configurations in total: 1~9. And there are six types of reverse radio configurations in total: 1~6. RC1 and RC2 are assigned to IS-95 no matter it is forward or reverse. Moreover, the forward RC6 to RC9 are assigned to cdma2000 3x, and RC3, RC4 and RC5 are assigned to cdma2000 1x. The reverse RC3 and RC4 are assigned to cdma2000 1x, and RC5 and RC6 are assigned to cdma2000 3x.

The core of the present invention is: the base station presets different reverse outer loop threshold values for different reverse RC types, and when terminals access, selects corresponding preset reverse outer loop threshold values according to the different types fed back by the terminals to implement reverse close loop power control, so as to guarantee that terminals of different RCs can all successfully access the system. After the terminals successfully access the system, different adjustment step lengths are applied in adjusting the reverse outer loop threshold values according to different reverse RC types in the reverse outer loop power control, so as to meet the system requirements better.

Wherein, the reverse threshold values and the adjustment step lengths set for different RC types are both set according to empirical values.

The present invention will be described and explained in detail below in conjunction with the drawings and embodiments.

Apparatus Embodiment

Figure 1:
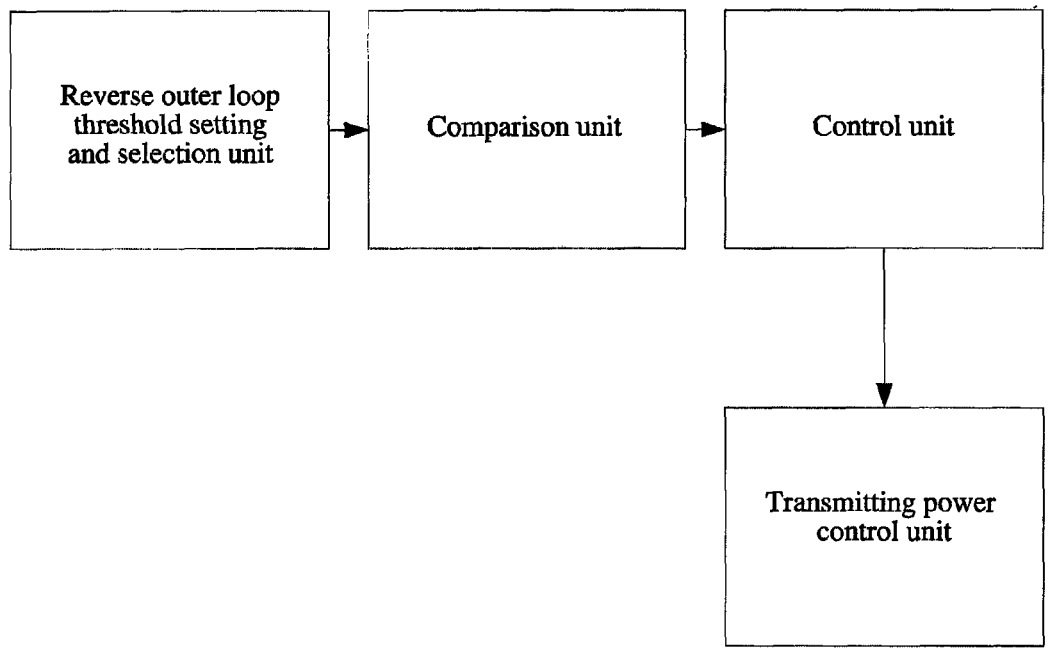
FIG. 1 is a block diagram of the apparatus for reverse power control in accordance with a first embodiment of the present invention.

FIG. 1 shows a block diagram of the apparatus for reverse power control in accordance with a first embodiment of the present invention, the apparatus being used in reverse close loop power control and including:

a setting and selection unit, configured to preset corresponding reverse outer loop threshold values according to RC types, and select a corresponding preset reverse outer loop threshold value according to a RC type of a terminal fed back;

a comparison unit, configured to compare the Eb/Nt of the received reverse channel with the reverse outer loop threshold value, and output the comparison result to a reverse outer loop threshold control unit;

the control unit, configured to instruct a transmitting power adjustment unit to increase or decrease the transmitting power of the terminal according to the comparison result;

the transmitting power adjustment unit, configured to increase or decrease the transmitting power of the terminal according to the instruction of the reverse outer loop threshold control unit.

The above apparatus for reverse outer loop power control is used in the process of a terminal accessing the system and guarantees that the terminal can access successfully.

Figure 2:
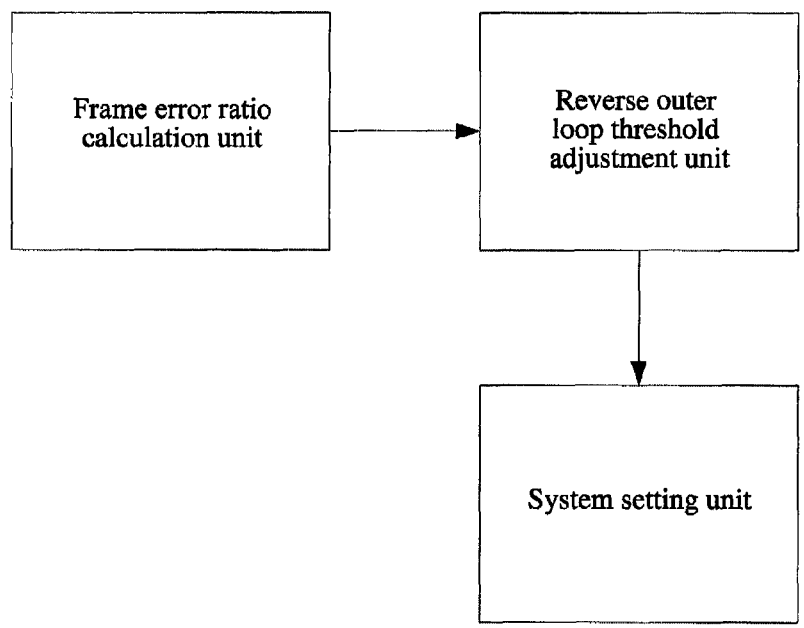
FIG. 2 is a block diagram of the apparatus for reverse power control in accordance with a second embodiment of the present invention.

FIG. 2 shows a block diagram of the apparatus for reverse power control in accordance with a second embodiment of the present invention, the apparatus being used in reverse outer loop power control and including:

a frame error ratio calculation unit, configured to calculate the current PER of reverse channel frames and send the current FER to a reverse outer loop threshold adjustment unit;

the reverse outer loop threshold adjustment unit, configured to preset corresponding adjustment step lengths according to RC types; compare the received current FER with a target FER, if the current FER is larger than the target FER, increase the reverse outer loop threshold value according to the preset adjustment step length; and if the current FER is smaller than the target FER, decrease the reverse outer loop threshold value according to the preset adjustment step length.

a system setting unit, configured to compare the adjusted reverse outer loop threshold value with a system specified reverse outer loop maximum threshold value, and if the adjusted reverse outer loop threshold value is larger than the system specified reverse outer loop maximum threshold value, set the adjusted reverse outer loop threshold value as the system specified reverse outer loop maximum threshold value; to compare the adjusted reverse outer loop threshold value with a system specified reverse outer loop minimum threshold value, and if the adjusted reverse outer loop threshold value is smaller than the system specified reverse outer loop minimum threshold value, set the adjusted reverse outer loop threshold value as the system specified reverse outer loop minimum threshold value; and in other situations, not to change the system specified reverse outer loop maximum and minimum threshold values.

The above apparatus for reverse outer loop power control is used after a terminal accesses the system successfully, and can adjust the reverse outer loop threshold more flexibly and increase the system capacity.

Method Embodiment 1

In the following, the CDMA2000 system is taken as an example to illustrate the features of the present invention. Supposing the system supports terminals with reverse radio configurations RC1 and RC3, according to the prior art, the base station configures the same reverse outer loop threshold value 130 for the terminals of RC1 and RC3, and as the reverse outer loop threshold value provided by the base station is too small, even though the terminal of RC1 tries to increase its transmitting power, the actual transmitting power of the terminal of RC1 cannot meet the requirements of the radio environment since the power cannot be higher than the threshold value, as a result, the RF signal received by the base station is still weak and cannot be demodulated, and the terminal cannot access the base station system. However, the terminal of RC3 does not have such a problem.

With the method of the present invention, the reverse outer loop threshold value for RC1 can be set to 211, while the reverse outer loop threshold value for RC3 can be set to 130, so as to solve the above problem, and not only guarantee that the RC1 terminal can access successfully, but also guarantee the stability of the system.

Method Embodiment 2

Figure 3:
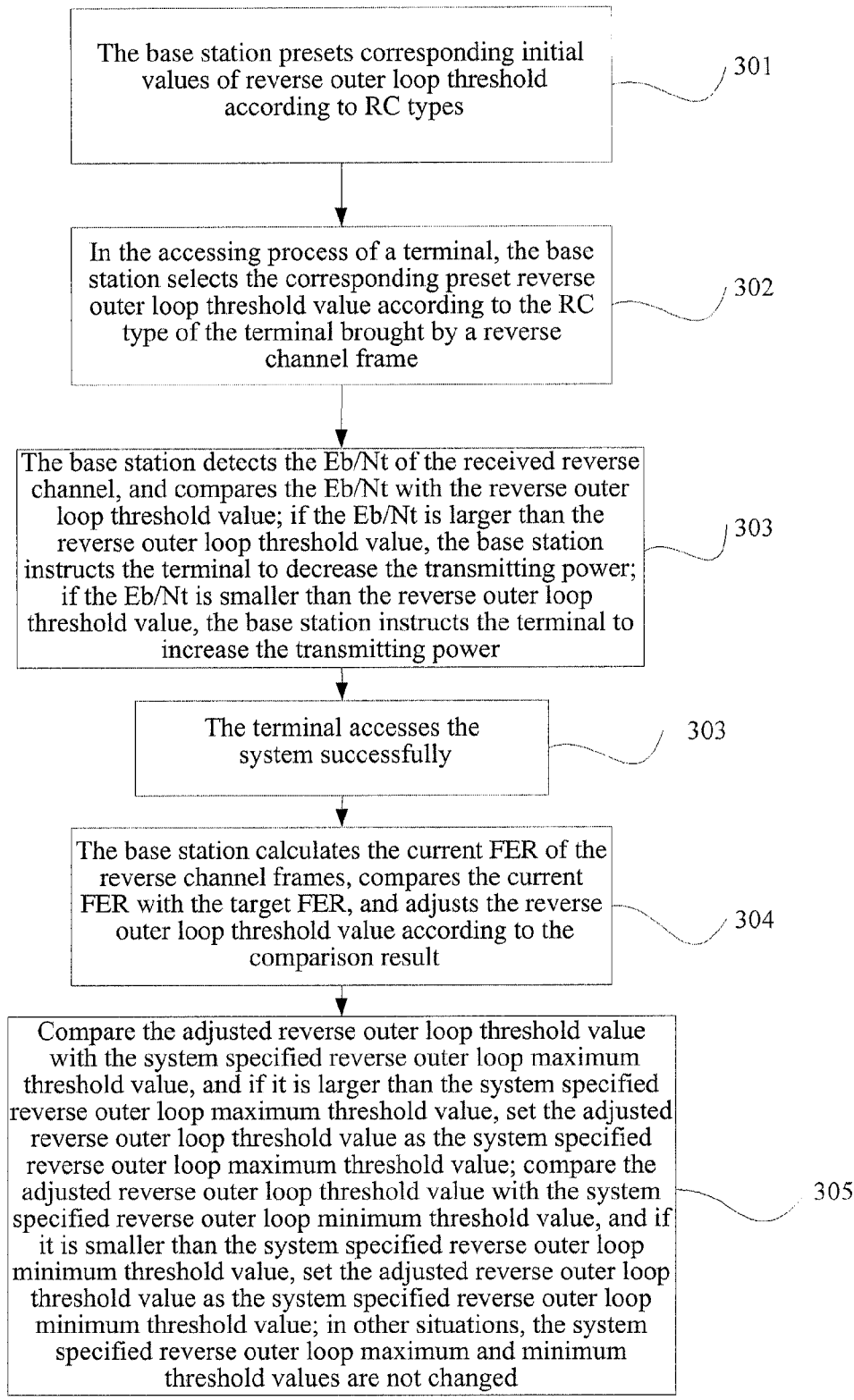
FIG. 3 is a flow chart of the method for reverse power control in accordance with the present invention.

FIG. 3 shows a flow chart of the method for reverse power control in accordance with the present invention, the method including:

301: The base station presets the corresponding initiate values of reverse outer loop threshold according to RC types, for example, RC1 corresponds to RevOutLoopThreshold1, RC2 corresponds to RevOutLoopThreshold2, RC3 corresponds to RevOutLoopThreshold3, and so forth. The initial values of reverse outer loop threshold for different RC types are a group of empirical values;

302: In the accessing process of a terminal, the base station selects the corresponding preset reverse outer loop threshold value according to the RC type of the terminal brought by a reverser channel frame;

303: The base station detects the Eb/Nt of the received reverse channel, wherein Eb/Nt is the ratio of received energy per bit to total effective noise power, and then compares the Eb/Nt with the reverse outer loop threshold value, if the Eb/Nt is larger than the reverse outer loop threshold value, the base station instructs the terminal to decrease the transmitting power; if the Eb/Nt is smaller than the reverse outer loop threshold value, the base station instructs the terminal to increase the transmitting power, so as to guarantee that the terminal accesses successfully.

304: After the terminal accesses successfully, the base station calculates the current FER of reverse channel frames and compares the current FER with a target FER, and adjusts the reverse outer loop threshold value according to the comparison result.

The current FER is calculated according to the reverse frames demodulated currently, and the current FER=the number of error frames/the total number of frames; the target FER is set at the base station, and voice quality is taken into account during the setting; if the PER is high, the voice quality will be very poor, and drop-call may even be caused; at present, in order to meet the system requirements, it is generally set to 2%.

305: Adjustment is performed by using preset adjustment step lengths for different RC types, for example, RC1 corresponds to RevOutLoopStep1, RC2 corresponds to RevOutLoopStep2, RC3 corresponds to RevOutLoopStep3, and so forth. The values of adjustment step lengths for different RC types are a group of empirical values.

If the current FER is larger than the target PER, the reverse outer loop threshold value is increased according to the preset adjustment step length; if the current PER is smaller than the target PER, the reverse outer loop threshold value is decreased according to the preset adjustment step length.

306: The adjusted reverse outer loop threshold value is compared with a system specified reverse outer loop maximum threshold value, if the adjusted reverse outer loop threshold value is larger than the system specified reverse outer loop maximum threshold value, the adjusted reverse outer loop threshold value is set as the system specified reverse outer loop maximum threshold value; and the adjusted reverse outer loop threshold value is compared with a system specified reverse outer loop minimum threshold value, if the adjusted reverse outer loop threshold value is smaller than the system specified reverse outer loop minimum threshold value, the adjusted reverse outer loop threshold value is set as the system specified reverse outer loop minimum threshold value; in other situations, the system specified reverse outer loop maximum and minimum threshold values are not changed.

The system specified maximum and minimum threshold values are a group of empirical values, and they are set separately at a background operation platform according to different RC types, for example, RC1 corresponds to RevOutLoopMaxThreshold1/RevOutLoopMinThreshold1, RC2 corresponds to RevOutLoopMaxThreshold2/RevOutLoopMinThreshold2, RC3 corresponds to RevOutLoopMaxThreshold3/RevOutLoopMinThreshold3, and so forth. However, the same values may be set for the RCs if desired.

The reverse close loop power control by using the reverse outer loop threshold in the above method is more suitable for terminals of various RCs, and can adjust their transmitting powers to target values more quickly. It on the one hand increases the access success rate of terminals of various RCs, and on the other hand make the overall transmitting power of the reverse link always maintained in the target state since the convergence speed of the transmitting power of the terminal side is increased, and thus increases the system capacity.

Of course, the present invention may have many other embodiments, and without departing from the spirit and essence of the present invention, the person skilled in the art can make various corresponding modifications and variations according to the present invention, but these corresponding modifications and variations shall all belong to the protection scope of the claims of the present invention.

INDUSTRIAL APPLICABILITY

Compared with the prior art, the present invention introduces the RC parameters to set and adjust the reverse outer loop threshold, which is more suitable for terminal of different RC types, so that terminals of different RC types can adjust their transmitting powers to target transmitting powers quickly and it is guaranteed that terminal of various RC types can access the system quickly. In particular, the present invention focuses on the setting and application of the reverse outer loop threshold values used in the accessing process of terminals, and ultimately increases the access success rate of various types of terminals.

What is claimed is:

1. A method for reverse power control comprising the following steps:
according to different reverse radio configuration (RC) types, a base station presetting different reverse outer loop threshold values corresponding to the RC types, wherein the different preset reverse outer loop threshold values correspond to the different RC types;
in an accessing process of a terminal, the terminal feeding back the RC type of the terminal through a reverse channel frame, and the base station selecting, from the preset different reverse outer loop threshold value, one preset reverse outer loop threshold value that corresponds to the RC type of the terminal according to the RC type fed back by the terminal;
the base station receiving Eb/Nt of the reverse channel, and comparing the received Eb/Nt with the selected reverse outer loop threshold value, if the Eb/Nt is larger than the reverse outer loop threshold value, the base station instructing the terminal to decrease transmitting power; if the Eb/Nt is smaller than the reverse outer loop threshold value, the base station instructing the terminal to increase transmitting power, so as to guarantee that the terminal accesses successfully.

2. The method of claim 1 further comprising:
after the terminal accesses successfully, the base station calculating current frame error ratio of reverse channel frames, comparing the current frame error ratio with a target frame error ratio, and adjusting the reverse outer loop threshold value according to the comparison result.

3. The method of claim 2 wherein,
the method further comprises: according to the RC types, presetting adjustment step lengths corresponding to the RC types; and
the step of adjusting the reverse outer loop threshold value according to the comparison result comprises: if the current frame error ratio is larger than the target frame error ratio, increasing the reverse outer loop threshold value according to a preset adjustment step length corresponding to the RC type of the terminal; if the current frame error ratio is smaller than the target frame error ratio, decreasing the reverse outer loop threshold value according to the preset adjustment step length corresponding to the RC type of the terminal.

4. The method of claim 3 further comprising:
comparing the adjusted reverse outer loop threshold value with a system specified reverse outer loop maximum threshold value, and if the adjusted reverse outer loop threshold value is larger than the system specified reverse outer loop maximum threshold value, setting the adjusted reverse outer loop threshold value as the system specified reverse outer loop maximum threshold value;
comparing the adjusted reverse outer loop threshold value with a system specified reverse outer loop minimum threshold value, and if the adjusted reverse outer loop threshold value is smaller than the system specified reverse outer loop minimum threshold value, setting the adjusted reverse outer loop threshold value as the system specified reverse outer loop minimum threshold value; and
in situations other than the above two situations, not changing the system specified reverse outer loop maximum and minimum threshold values.

5. The method of claim 1 wherein the type of RC is one or more of RC1, RC2, RC3, RC4, RC5 and RC6.

6. A base station comprising a hardware processor that executes the steps in the following units:
a setting and selection unit configured to preset different reverse outer loop threshold values according to different reverse radio configuration (RC) types, the different preset reverse outer loop threshold values correspond to the different RC types, wherein in an accessing process of a terminal, the terminal feeds back the RC type of the terminal through a reverse channel frame, and the setting and selection unit is further configured to select, from the present different reverse outer loop threshold values, a one preset reverse outer loop threshold value that corresponds to the RC type fed back by the terminal;

a comparison unit configured to receive Eb/Nt of the reverse channel, compare the received Eb/Nt with the reverse outer loop threshold value selected by the setting and selection unit, and output the comparison result to a reverse outer loop threshold control unit;

the control unit configured to instruct a transmitting power adjustment unit to increase or decrease transmitting power of the terminal according to the comparison result of the comparison unit; and the transmitting power adjustment unit configured to increase or decrease the transmitting power of the terminal according to the instruction of the reverse outer loop threshold control unit, thereby implementing reverse close loop power control.

7. The base station of claim 6 wherein the processor further executes the steps in the following units:

a frame error ratio calculation unit configured to calculate the current frame error ratio of reverse channel frames and send the calculated frame error ratio to a reverse outer loop threshold adjustment unit;

the reverse outer loop threshold adjustment unit configured to compare the received current frame error ratio with a target frame error ratio, and, if the current frame error ratio is larger than the target frame error ratio, increase the reverse outer loop threshold value; if the current frame error ratio is smaller than the target frame error ratio, decrease the reverse outer loop threshold value, thereby implementing reverse outer loop power control.

8. The base station of claim 7 wherein the reverse outer loop threshold adjustment unit is further configured to preset adjustment step lengths according to the RC types and use a preset adjustment step length corresponding to the RC type of the terminal to adjust the reverse outer loop threshold value when increasing or decreasing the reverse outer loop threshold value, so as to acquire an adjusted reverse outer loop threshold value.

9. The base station of claim 8 wherein the processor further executes the steps in a following unit:

a system setting unit configured to compare the adjusted reverse outer loop threshold value with a system specified reverse outer loop maximum threshold value, and if the adjusted reverse outer loop threshold value is larger than the system specified reverse outer loop maximum threshold value, set the adjusted reverse outer loop threshold value as the system specified reverse outer loop maximum threshold value, compare the adjusted reverse outer loop threshold value with a system specified reverse outer loop minimum threshold value, and if the adjusted reverse outer loop threshold value is smaller than the system specified reverse outer loop minimum threshold value, set the adjusted reverse outer loop threshold value as the system specified reverse outer loop minimum threshold value, and, in other situations, not change the system specified reverse outer loop maximum and minimum threshold values.

* * * * *